United States Patent
Mukaihara et al.

(10) Patent No.: US 10,309,336 B2
(45) Date of Patent: Jun. 4, 2019

(54) CONTROL DEVICE FOR FUEL INJECTION VALVE

(71) Applicant: HITACHI AUTOMOTIVE SYSTEMS, LTD., Hitachinaka-shi, Ibaraki (JP)

(72) Inventors: Osamu Mukaihara, Ibaraki (JP); Masahiro Toyohara, Ibaraki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 15/540,310

(22) PCT Filed: Jan. 29, 2016

(86) PCT No.: PCT/JP2016/052566
§ 371 (c)(1),
(2) Date: Jun. 28, 2017

(87) PCT Pub. No.: WO2016/129402
PCT Pub. Date: Aug. 18, 2016

(65) Prior Publication Data
US 2018/0010545 A1  Jan. 11, 2018

(30) Foreign Application Priority Data
Feb. 9, 2015  (JP) .................................. 2015022787

(51) Int. Cl.
*F02M 1/00* (2006.01)
*F02D 41/40* (2006.01)
(Continued)

(52) U.S. Cl.
CPC ............. *F02D 41/40* (2013.01); *F02D 41/20* (2013.01); *F02D 41/22* (2013.01); *F02D 41/221* (2013.01);
(Continued)

(58) Field of Classification Search
CPC ..... F02D 41/30; F02D 2041/389; F02D 41/22
(Continued)

(56) References Cited

U.S. PATENT DOCUMENTS

2006/0207558 A1* 9/2006 Tahara ................. F02D 41/221
123/431
2006/0266332 A1 11/2006 Kloos et al.
(Continued)

FOREIGN PATENT DOCUMENTS

DE  10 2004 006 896 A1  9/2005
DE  10 2006 035 451 A1  6/2007
(Continued)

OTHER PUBLICATIONS

Japanese Office Action dated Jul. 5, 2018 in corresponding application No. 2016-574718.
(Continued)

*Primary Examiner* — John Kwon
(74) *Attorney, Agent, or Firm* — Foley & Lardner LLP

(57) ABSTRACT

The present invention determines whether multi-stage injection control is operating normally or abnormally, and carries out a failsafe of multi-stage injection control as necessary. The present invention, which solves the problem described above, has means such as the following. The invention is provided with fuel injection valves provided respectively to each cylinder, an opened/closed valve detection means for detecting either one or both of an open valve state and a closed valve state of the fuel injection valves on the basis of the drive currents or drive voltages of the fuel injection valves, and a detection execution determination means for determining a detection execution time period including the detection start timing and the detection end timing of the open valve state or closed valve state; detection interference such as overlapping detection with another cylinder and
(Continued)

overlapping of open valve detection and closed valve detection being preventable, and risks such as erroneous detection being reducible.

15 Claims, 8 Drawing Sheets

(51) Int. Cl.
   *F02D 41/22* (2006.01)
   *F02D 41/20* (2006.01)
   *B60T 7/12* (2006.01)
   *F02D 41/38* (2006.01)

(52) U.S. Cl.
   CPC ............ *F02D 41/402* (2013.01); *F02D 41/38* (2013.01); *F02D 2041/2013* (2013.01); *F02D 2041/2055* (2013.01); *F02D 2041/224* (2013.01); *F02D 2200/06* (2013.01); *F02D 2200/0602* (2013.01); *F02D 2200/0614* (2013.01); *F02D 2200/0618* (2013.01); *F02D 2250/04* (2013.01); *Y02T 10/44* (2013.01)

(58) Field of Classification Search
   USPC ........ 123/445, 446, 472, 478, 480; 701/104, 701/105, 111, 114
   See application file for complete search history.

(56) References Cited

U.S. PATENT DOCUMENTS

| | | | |
|---|---|---|---|
| 2007/0114481 A1 | 5/2007 | Suyama | |
| 2010/0017100 A1* | 1/2010 | Yamamoto | F02D 41/2438 701/104 |
| 2010/0031941 A1* | 2/2010 | Hokuto | F02D 41/0025 123/575 |
| 2012/0016563 A1 | 1/2012 | Ohsaki | |
| 2014/0318227 A1 | 10/2014 | Joos et al. | |
| 2015/0377176 A1 | 12/2015 | Hatanaka et al. | |
| 2016/0003182 A1* | 1/2016 | Fujii | F02D 41/20 123/478 |
| 2016/0177855 A1 | 6/2016 | Kusakabe et al. | |

FOREIGN PATENT DOCUMENTS

| | | |
|---|---|---|
| DE | 10 2011 083 033 A1 | 3/2013 |
| EP | 1 598 540 A2 | 11/2005 |
| JP | S62-153564 A | 7/1987 |
| JP | S63-012878 A | 1/1988 |
| JP | H03-017173 U1 | 2/1991 |
| JP | H08-004577 A | 1/1996 |
| JP | H08-218967 A | 8/1996 |
| JP | H10-318027 A | 12/1998 |
| JP | 2001-336462 A | 12/2001 |
| JP | 2005-330945 A | 12/2005 |
| JP | 2007-138851 A | 6/2007 |
| JP | 2012-021428 A | 2/2012 |
| JP | 2013-036344 A | 2/2013 |
| JP | 2013-204442 A | 10/2013 |
| JP | 2014-031790 A | 2/2014 |
| JP | 2014-152697 A | 8/2014 |
| WO | WO-2013/191267 A1 | 12/2013 |
| WO | WO-2015/015541 A1 | 2/2015 |

OTHER PUBLICATIONS

Extended European Search Report dated Aug. 28, 2018 issued in European patent application No. 16749046.5.

International Search Report dated May 17, 2016 as issued in corresponding International Application No. PCT/JP2016/052566 and its English translation thereof.

Japanese Office Action dated Mar. 5, 2019 in corresponding application No. 2016-574718.

* cited by examiner

CONTROL DEVICE FOR FUEL INJECTION VALVE

TECHNICAL FIELD

The present invention relates to a control device which controls a fuel injection valve of an internal combustion engine, and particularly to a fuel injection valve control device of an internal combustion engine of a type of in-cylinder direct injection in which fuel is directly injected into a cylinder.

BACKGROUND ART

In recent years, as a countermeasure for improving an exhausting performance of an internal combustion engine, there is performed a multi-stage injection control in which the fuel is injected at least a plurality of times in one combustion cycle. In the multi-stage injection control, the fuel injection is divided on the basis of the number of times of multi-stage injection obtained from an operation state of the internal combustion engine, and performed.

In addition, a fuel injection amount at the time of performing the multi-stage injection control is calculated as a total injection amount using the fuel injection amount calculated by a conventional operational expression, and a drive control is performed on the fuel injection valve by the fuel injection amount at every number of times of multi-stage injection obtained by dividing the total injection amount from a division ratio based on the number of times of multi-stage injection.

PTL 1 discloses a control device in a multi-stage injection control system which is separately provided with a control device to calculate the fuel injection amount and a drive circuit of the fuel injection valve. The control device determines whether the drive circuit correctly transmits a drive signal to the fuel injection valve in correspondence with a control command which is output from the control device to the drive circuit.

CITATION LIST

Patent Literature

PTL 1: JP 2013-36344 A

SUMMARY OF INVENTION

Technical Problem

In the invention disclosed in PTL 1, it is checked whether the output from the drive circuit is normal to determine whether the fuel injection valve operates according to the control command of the control device, but an actual operation of the fuel injection valve itself is not checked.

Therefore, in the invention disclosed in PTL 1, it is determined that the fuel injection valve operates according to the command of the control device when the output of the drive circuit is normal. In practice, there is a concern that it is not possible to detect an abnormal state in a case where mechanical friction or an operational characteristic of the structure of the fuel injection valve is changed, and thus the expectation of the exhausting performance may be not satisfied.

Further, when the multi-stage injection control is performed, in a case where a control command value of the number of times of multi-stage injection is not matched with the actual number of times of injection of the fuel injection valve due to a failure of the structure or a deterioration in the operational characteristic of the fuel injection valve, there is a concern that the exhausting performance is significantly damaged.

The invention has been made in view of such problems, and an object thereof is to realize a control device which can detect abnormality of a fuel injection control caused by abnormality of an element other than the drive circuit such as a change in a structure characteristic of the fuel injection valve or a deterioration of an operational characteristic, and also can guarantee the exhausting performance.

Solution to Problem

In order to solve the problem, a control device of a fuel injection valve according to the present invention is a control device of a fuel injection valve that controls the fuel injection valve for injecting fuel to an internal combustion engine according to a control command, wherein it is determined whether the fuel injection valve performs an operation corresponding to the control command on the basis of a parameter that is changed according to an operation state of the fuel injection valve.

In addition, the control device of the fuel injection valve according to another aspect of the invention performs a multi-stage injection control in which the fuel injection valve injects the fuel plural times in one combustion cycle of the internal combustion engine, and determines whether the fuel injection valve multi-injects an many as the number of times corresponding to the control command on the basis of the parameter.

Advantageous Effects of Invention

According to the invention, it is possible to detect abnormality of a fuel injection control caused by abnormality of an element other than the drive circuit such as a change in a structure characteristic of the fuel injection valve or a deterioration of an operational characteristic, and also to guarantee the exhausting performance.

Further, in a system which performs multi-stage injection control, an actual operation can be guaranteed in the number of times of multi-stage injection, and it is possible to appropriately shift the control to a fail-safe control such as forbidding the multi-stage injection control at the time of abnormality or correcting the fuel injection amount. Furthermore, the exhausting performance can be guaranteed.

DESCRIPTION OF EMBODIMENTS

Hereinafter, embodiments of the invention will be described using the drawings.

First Embodiment

Figure 1:
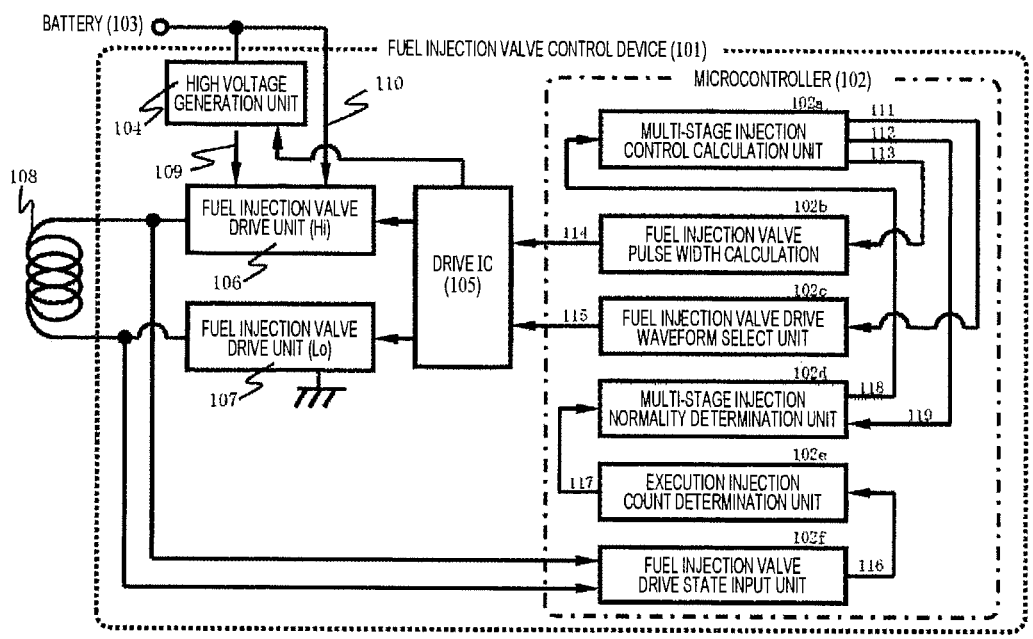
FIG. 1 is a diagram illustrating the entire configuration of the invention.

FIG. 1 is a diagram illustrating an example of a basic configuration in a control device for fuel injection. First, a battery voltage (110) supplied from a battery (103) is supplied through a fuse (not illustrated) and a relay (not illustrated) to a fuel injection valve control device (101) provided in a control device (not illustrated) for an internal combustion engine which controls an on-vehicle engine.

In the fuel injection valve control device (101), there is provided a high voltage generating unit (104) which generates a high power source voltage (hereinafter, referred to as high voltage 109) required after a valve body of the fuel injection valve performs a valve opening operation on the basis of the battery voltage (110) even in a state where the valve body provided in a fuel injection valve (108) is in a high fuel pressure (hereinafter, referred to as Hi fuel pressure).

The high voltage generating unit (104) boosts a voltage from the battery voltage (110) to a predetermined target high voltage on the basis of a command from the drive IC (105). The valve body in the fuel injection valve (108) can obtain an open valve force higher than a strong close valve force generated by a high fuel pressure by applying the generated high voltage (109) at the time of starting the operation of the fuel injection valve.

In addition, the drive IC (105) performs a current control by controlling drive units (106 and 107) of the fuel injection valve in a predetermined sequence on the basis of a drive time (pulse signal 114) of the fuel injection valve (108) input from a microcontroller (102) and a setting value (115) of the drive current of the fuel injection valve (108). The drive units (106 and 107) of the fuel injection valve will be described below using FIG. 2.

FIG. 1 illustrates an example in which the microcontroller (102) and the drive IC (105) are simultaneously mounted in the fuel injection valve control device (101), and the microcontroller (102) and the drive IC (105) may be mounted in separate devices and connected by a communication line.

The pulse signal (114) of the fuel injection valve and the setting value (115) of the drive current are calculated in the microcontroller (102). Specifically, a multi-stage injection control calculation unit (102a) is provided as a program in an inner memory of the microcontroller (102) or a memory (not illustrated), and is executed by the microcontroller (102). The multi-stage injection control calculation unit determines whether a multi-stage injection is performed on the basis of an operation state or an operation scene of the internal combustion engine. In a case where the multi-stage injection control is allowed, the number of times of multi-stage injection, a division ratio of a fuel injection amount, and each injection timing are calculated by a predetermined operational expression. As a matter of course, in a case where it is determined that the multi-stage injection control is forbidden, the fuel is injected only once during one combustion cycle, and a drive calculation process of the fuel injection valve (108) is performed by a drive calculation process according to the related art.

The multi-stage injection control calculation unit (102a) calculates the number of times of multi-stage injection, the division ratio, and a drive timing of the fuel injection valve (108) in a predetermined order in addition to the fuel injection amount determined on the basis of the operation state of the internal combustion engine, and outputs the information (113) to a fuel injection valve pulse signal calculation block (102b).

The fuel injection valve pulse signal calculation block (102b) calculates the fuel injection amount for every injection which is performed in plural times during the multi-stage injection control (for example, the fuel injection amount is divided by the division ratio), generates the pulse signal (114) for every fuel injection valve (108) provided in the internal combustion engine, and outputs the pulse signal to the drive IC (105).

In addition, a fuel injection valve waveform command block (102c) outputs a drive current profile (115) of the fuel injection valve (108) determined on the basis of information (111) such as the operation state of the internal combustion engine and a fuel pressure to the drive IC (105).

With the drive control, when the valve body of the fuel injection valve (108) performs the operation from opening to closing, a signal causing a physical change is input to a fuel injection valve state input unit (102f). In this drawing, the signal causing a physical change is illustrated as a drive voltage (specifically, working pressure) of the fuel injection valve (108).

In addition, in the fuel injection valve state input unit (102f), a predetermined signal processing (for example, filtering and fast Fourier transform) is performed as needed.

The fuel injection valve state input unit (102f) inputs the received information to an execution injection count determination unit (102e) (116), and determines whether a predetermined condition is satisfied. Therefore, it is determined whether the fuel injection valve (108) is normally or abnormally operated. On the basis of the result, the number of times of normal injection or the number of times of abnormal injection is counted.

It is determined whether the multi-stage injection control is normal or not by determining whether the result (117) of the execution injection count determination unit (102e) and the number of times of command injection (119) calculated by the multi-stage injection control calculation unit (102a) are matched to each other.

In addition, in a case where the result (117) of the execution injection count determination unit (102e) and the number of times of command injection calculated by the multi-stage injection control calculation unit (102a) are not matched to each other, the fuel injection amount required for the internal combustion engine is not satisfied. Therefore, it is determined that the multi-stage injection control is abnormal on the basis of an error in the fuel injection amount.

Further, as a matter of course, this drawing illustrates a simplified actual configuration on the basis of the above explanation. For example, the pulse signal (114) is generally provided in every fuel injection valve provided in the internal combustion engine. Similarly, the number of times of injection, the division ratio, and the injection timing related to the multi-stage injection control also change with time, and thus it is desirable that the process be performed on each cylinder.

Similarly, information (116) calculated by the fuel injection valve state input unit (102f), the result (117) of the execution injection count determination unit (102e), the number of times of command injection (119) are provided in every cylinder.

Figure 2:
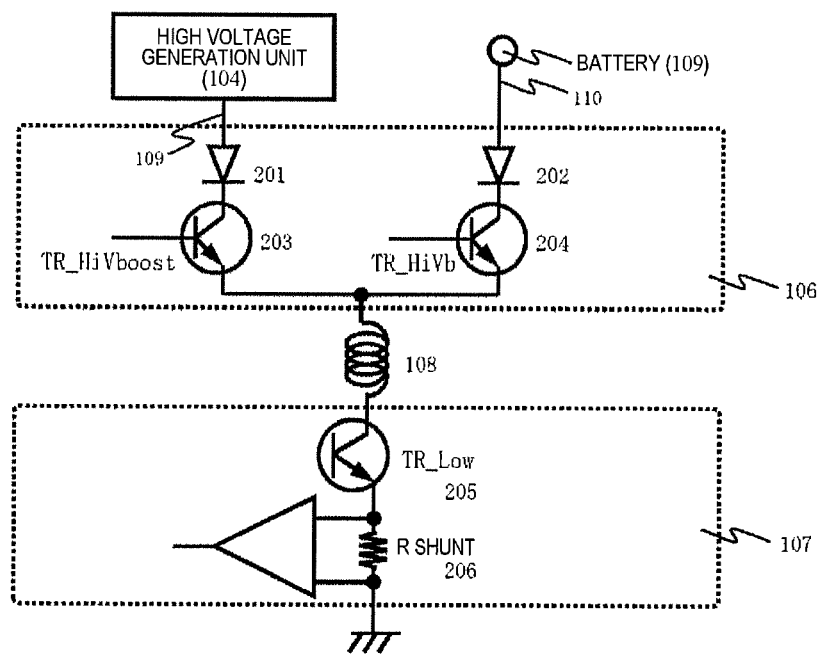
FIG. 2 is a diagram illustrating a configuration of a drive unit of a fuel injection valve.

Next, the description will be given with reference to FIG. 2 in detail about the drive units (106 and 107) of the fuel injection valve (108) illustrated in FIG. 1.

As described using FIG. 1, in order to supply the current required for opening the fuel injection valve (108), the drive unit (106) on the upstream side of the fuel injection valve (108) supplies the high voltage (109) generated by the high voltage generating unit (104) to the fuel injection valve (108) using a circuit TR_Hivboost (203) in the drawing through a diode (201) provided to prevent the current from flowing backward. On the other hand, after the fuel injection valve (108) is opened, similarly to the high voltage (109), the battery voltage (110) required for holding the valve body of the fuel injection valve (108) to be in an open valve state is supplied to the fuel injection valve (108) using a circuit TR_Hivb (204) in the drawing through a diode (202) provided to prevent the current from flowing backward.

Next, TR_Low (205) is provided in the drive unit (107) on the downstream side of the fuel injection valve (108). With respect to the fuel injection valve (108), when the drive circuit TR_Low (205) is turned on, a power source voltage (109 or 110) from the drive unit (106) of the fuel injection valve on the upstream side can be applied to the fuel injection valve (108). In addition, a shunt resistor (206) is provided on the downstream side of TR_Low (205). A desired current control of the fuel injection valve (108) is performed by detecting the current value flowing to the fuel injection valve (108).

Further, the present explanation is about an exemplary drive method of the fuel injection valve (108). For example, in a case where the fuel pressure is relatively low or in a case of a system in which the fuel is injected to an inlet port of the internal combustion engine, there is a method in which the battery voltage (110) is used in place of the high voltage (109) at the time of opening the fuel injection valve (108).

In addition, TR_Hivboost (203), TR_Hivb (204), and TR_Low (205) each can be realized using switching elements such as MOSFETs.

Next, a drive method of the fuel injection valve (108) in the related art will be described using FIG. 3.

Figure 3:
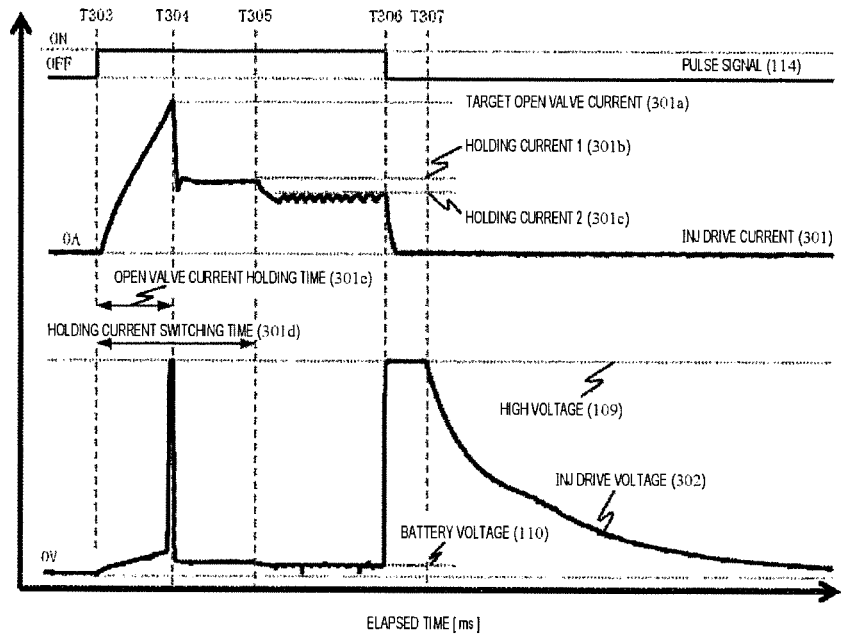
FIG. 3 is a diagram illustrating an exemplary driving of the fuel injection valve according to the related art.

FIG. 3 illustrates behaviors of a drive current (301) and a drive voltage (302) when the fuel injection valve is driven. In the drawing, the pulse signal (114) which is a drive command of the fuel injection valve, the drive current (301), and the drive voltage (302) are illustrated from the upper portion. Further, the drive voltage (302) indicates a voltage generated between the drive unit (107) of the fuel injection valve on the downstream side in FIG. 1 and GND of a fuel injection valve control device (201).

When the pulse signal (114) is input from the microcontroller (102) to the drive IC (105), the drive IC (105) drives the fuel injection valve (108) on the basis of the pulse signal. Specifically, the driving of the fuel injection valve (108) starts from a time point (T303) at which the pulse signal transitions from OFF to ON. The drive IC (105) controls the current of the fuel injection valve (108) on the basis of the drive current profile (115) determined by the fuel injection valve waveform command block (102c) in FIG. 1.

An exemplary current control is illustrated in FIG. 3. First, the high voltage (109) is supplied until a time point (T304) at which the drive current (301) reaches a target open valve current (301a) which is a control target value at the beginning. In addition, in another method, the high voltage (109) is supplied to the fuel injection valve (108) during a predetermined period (301e) from the time point (T303) at which the pulse signal (114) transitions to ON as a control target at the time of opening the valve.

Thereafter, the control target value of the drive current (301) is shifted to a first holding current (301b). Herein, the power source voltage is switched to the battery voltage (110) which is the power source voltage for holding the valve and then, as needed, switched to a second holding current (301c) which is a second holding current target value (T305). The switching of the holding current is, for example, set as a predetermined period (301d) on the basis of the characteristic of the fuel injection valve (108) from the time point (T303) at which the pulse signal (114) is turned on. In addition, the drive current (301) is held on the first holding current (301b) or the second holding current (301c) which is the control target value. Therefore, an ON/OFF control of the circuit TR_Hivb (204), a so-called duty control (also referred to as chopper control), is performed, and continues until a time point (T306) at which the pulse signal (114) transitions from ON to OFF.

From T306 at which the pulse signal transitions to OFF, a residual magnetic flux in the fuel injection valve (108) is quickly leaked, and the high voltage (109) is supplied in a reverse direction during a predetermined period (until T307) in order to close the valve body in the fuel injection valve (108) in early stage.

Further, while an exemplary current control is illustrated in this drawing, there is an optimal drive current profile according to an operation state of the internal combustion engine which includes the characteristic and the fuel pressure of the fuel injection valve (108). Therefore, it is possible to obtain the effect of the invention without being limited to the drive current described in this drawing.

Next, the multi-stage injection control will be described.

Figure 4:
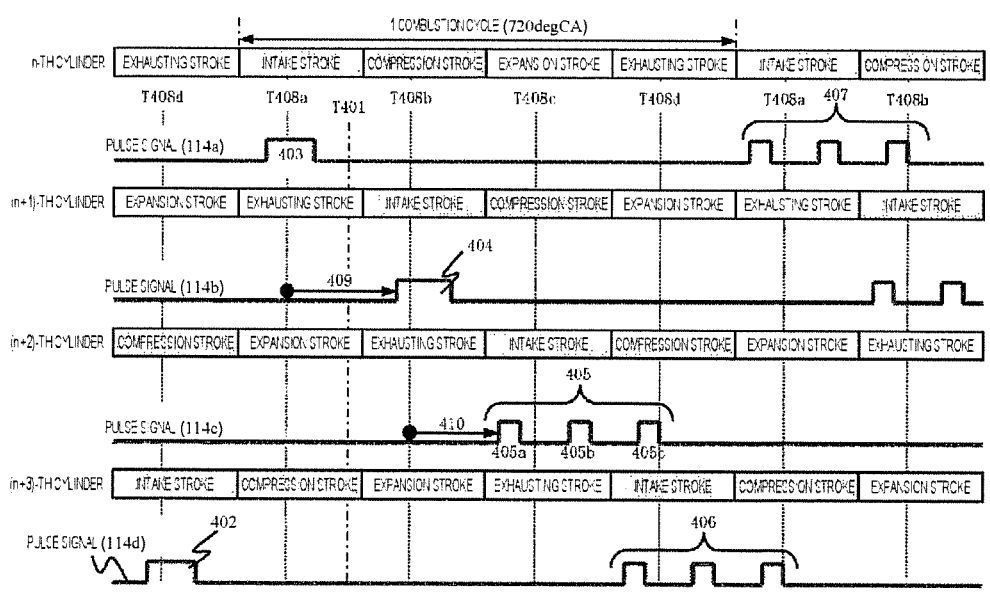
FIG. 4 is a diagram for describing multi-stage injection control.

FIG. 4 illustrates the pulse signal (114) when the control is switched from one-time injection (the injection control of the related art) to the multi-stage injection. T401 in the drawing illustrates a time point when the multi-stage injection control is allowed.

First, not limited to the fuel injection valve (108), as a general method of performing an architecture drive (so-called angle control) on the basis of a predetermined crank angle, control reference positions (T408a to T408d) are provided at the respective cylinders, and timing for an architecture operation is calculated at a desired angle on the basis of the control reference positions (T408a to T408d).

Making an explanation on FIG. 4 on the basis of the above configuration, the multi-stage injection control is forbidden in the past from T401 (the left side from T401 in the drawing), and the normal one-time injection is performed (402 and 403). Further, with respect to T401, a future injection execution signal (404) (the right side from T401 in the drawing) also becomes one-time injection because the control reference position is on the left side with respect to T401, and the injection control is performed at an injection timing (409) of this time point.

On the contrary, an injection command indicated by 405 is generated at an injection timing (401) for the multi-stage injection from T408b which is the first control reference position from T401, and thus the multi-stage injection is performed at this time point. Thereafter, the multi-stage injection control continues, and the same control as that of 405 is performed. Therefore, the multi-stage injection is also performed in 406 and 407.

Further, while the multi-stage injection control in the drawing is illustrated as the injection is performed three times (405a, 404b, and 405c), the basic control method does not change even in a case where the number of times is different.

In addition, as a definition of the multi-stage injection in the invention, the fuel injection is performed at least one or more times in one combustion cycle. The one combustion cycle is different in position (angle) at every cylinder, but an interval between combustion strokes (intake, compression, expansion, and exhausting) of a 4-cycle type is 720 deg.

Next, the description will be given about behaviors of a drive current and a drive voltage of the fuel injection valve (108) in the multi-stage injection control (normal time).

Figure 5:
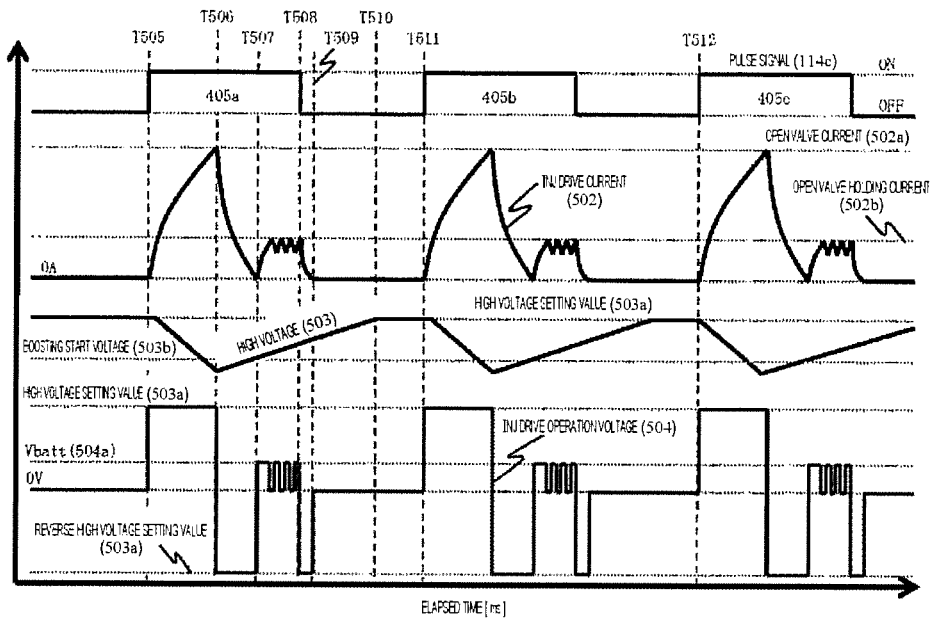
FIG. 5 is a diagram illustrating an exemplary driving of the fuel injection valve at the time of multi-stage injection.

FIG. 5 is, for example, an expanded view of 405a, 405b, and 405c in FIG. 4. A pulse signal (501), a drive current (502), a high voltage (503), and a drive voltage (504) to the fuel injection valve (108) are illustrated from the upper portion. Further, the drive voltage (504) of this drawing illustrates the working pressures on the upstream side and the downstream side of the fuel injection valve (108) as illustrated in FIG. 1.

In FIG. 4, the multi-stage injection control is performed three times of injection, and a pulse signal (114c) performs the fuel injection of each of 405a, 405b, and 405c. In addition, as an injection start timing, T505, T511, and T512 are set for the operation start timing of the fuel injection valve (108).

The drive current has a drive current profile in which the current supply to the fuel injection valve (108) is stopped until T507 after the current reaches an open valve current (502a) (T506), and the drive current is supplied again from T507.

At a time point (T508) at which the pulse signal (114c) is turned off, the supply of a drive current (502) to the fuel injection valve is stopped, and the current is supplied in the same drive sequence from the next injection start timing (T511 or T512). Observing the high voltage (503) at this point, in general, the high voltage (503) enters a boosted state until a high voltage setting value (503a), and the high voltage (503) is used in an open valve start timing (T505 to T506) of the fuel injection valve (108), and thus the voltage temporally is dropped. Thereafter, when the high voltage (503) is less than a boosting start voltage (503b), the drive IC (105) issues a boosting command to the high voltage generating unit (104), and the high voltage becomes the high voltage setting value (503a) again after a certain boosting voltage period (T510). Thereafter, the same operation is performed after the next injection operation start timing (T511).

Next, the drive voltage (504) will be described. The drive voltage (504) is supplied at a high voltage level from the beginning of the driving (405a) of the fuel injection valve (108) (T505), and the high voltage (503) is kept until the time point (T506) at which a drive current (502) reaches the open valve current (502a). As described above, the high voltage continues while accompanying a slight voltage drop.

On the drive current profile of this drawing, the current supply to the fuel injection valve (108) is stopped after the time point (T506) at which the current reaches the open valve current (502a), which is the same operation as that described in a case where the pulse signal of the drive current (302) of FIG. 3 is turned off (T306 to T307) (in this drawing, the high voltage (503) in the reverse direction is illustrated on a negative side since the working pressure is denoted). Thereafter, a control target of a drive current (502) becomes an open valve holding current (502b) from T507, the drive voltage (504) becomes a battery voltage (504a), and the duty control is performed from a time point when a drive current (502) reaches the open valve holding current (502b). Therefore, the drive voltage (504) is repeated to perform the ON-OFF operation until T508 at which the pulse signal (114c) is turned off.

Further, the behavior of the drive voltage (504) from the time point (T508) at which the pulse signal (114c) is turned off to T509 is the same as described above, and thus the description will be omitted. In addition, the above operation continues by the number of times designated by the multi-stage injection control, and the behaviors of the drive current (502) and the drive voltage (504) are the same as those described above, and thus the description will be omitted.

Next, an abnormal state at the time of the multi-stage injection control will be described using FIGS. 6, 7, 8, and 9.

Figure 6:
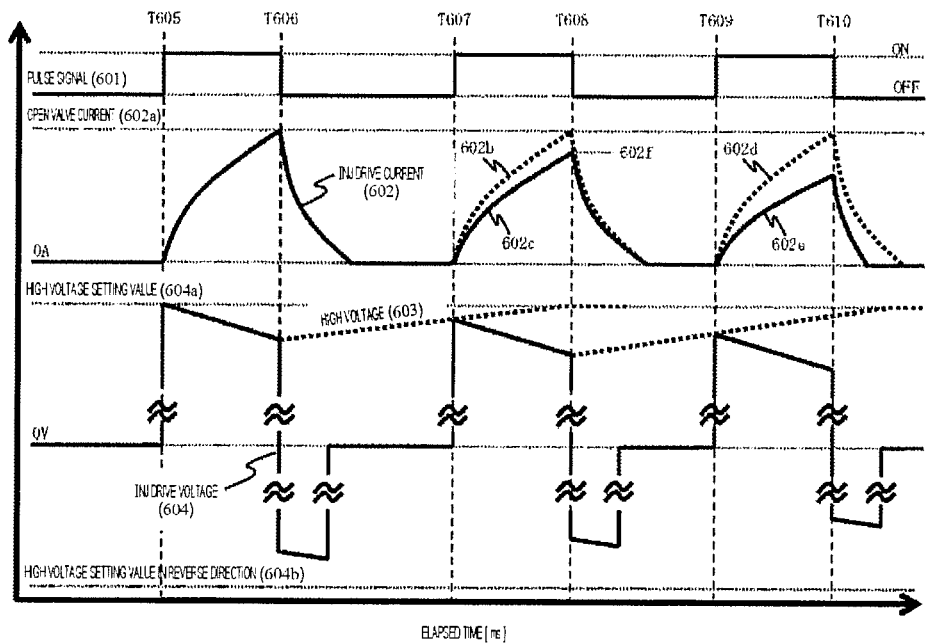
FIG. 6 is a diagram illustrating an example of a problem to be solved by the invention.

Similarly to FIG. 5, FIG. 6 illustrates the behaviors of the drive current (502) and the drive voltage (503) when the three-stage injection is performed. Similarly to FIG. 5, a command of the three-stage injection is performed on the fuel injection valve (108) at the injection start timing T605, T607, and T608 in the pulse signal (501). However, the injection start timing interval is set to be narrow compared to that of FIG. 5.

Specifically, a high voltage (603) in the first injection start timing (T605) is set to a high voltage setting value (604a). Therefore, as illustrated in FIG. 5, the current reaches an open valve current (602a) (current control target) at T606. In addition, since a pulse signal (601) is turned off at T606, the application of a drive current (602) is also stopped. There is no problem in operation of the fuel injection valve (108) in the first injection.

Herein, the behavior of a drive voltage (604) of the first stage is used from the high voltage setting value (604a) to the time point (T606) at which the current reaches the open valve current (602a), and thus a voltage drop occurs. Thereafter, the high voltage (603) is boosted until a predetermined period (T609 in the drawing) and returns to the high voltage setting value (604a). In a case where the injection start timing (T607) of the second stage occurs during the boosting operation, the high voltage is used again in a state where the voltage does not reach the high voltage setting value (604a). Therefore, originally the locus of the drive current (602) depicted by a broken line (602b) would be obtained, but as depicted by (602c), the pulse signal (601) is turned off before the current reaches the open valve current, and thus a desired open valve force is not able to be obtained. Therefore, the current reaches only the current (602f) not satisfying the open valve current (602a).

Even in the injection operation of the third stage, a deviation with respect to the high voltage setting value (604a) is large because the high voltage at the time of the injection start timing (T609) of the third stage becomes a low voltage with respect to the injection start timing (T607) of the second stage. As a result, the actual drive current with respect to the drive current 602d at the normal time draws a locus similar to that of 602e, and there is a concern that the open valve force is further lowered.

Figure 7:
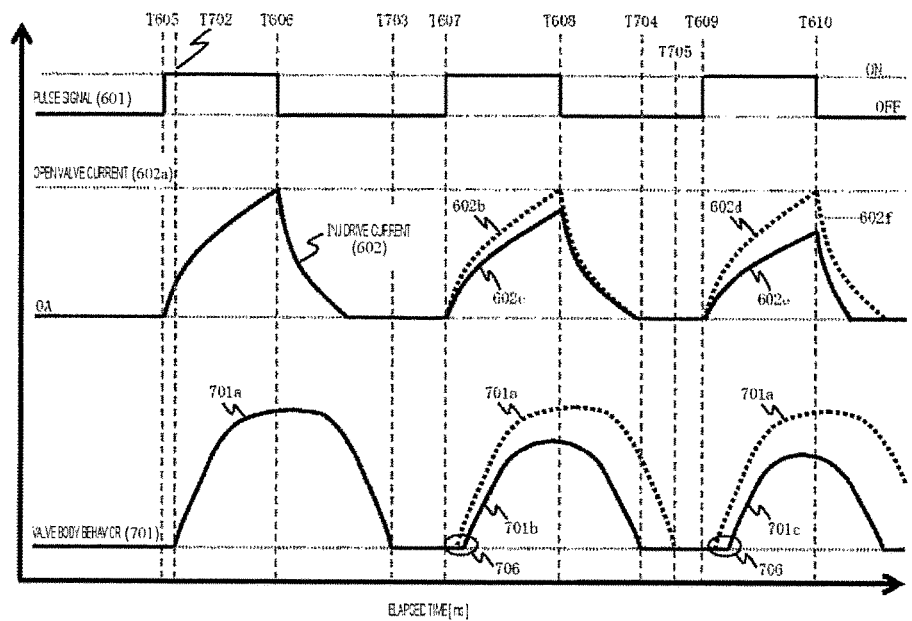
FIG. 7 is a diagram illustrating an example of a problem to be solved by the invention.

FIG. 7 illustrates a valve body behavior of the fuel injection valve (108). The pulse signal (601) and the drive current (602) in FIG. 7 are the same as those in FIG. 6, and thus the description will be omitted. With this regard, a valve body behavior (701) starts the valve opening operation with a slight delay time from the time point (T605) at which the pulse signal (601) is turned on (T702). This is caused by the fact that the drive current (602) is applied to the fuel injection valve (108), and it takes a time until an electromotive force is generated to open the valve body. In addition, the pulse signal (601) is turned off at T606, but the valve body behavior (701) remains in the open valve state due to the residual magnetic flux in the fuel injection valve (108). Therefore, it takes a time until the behavior is shifted to a close valve operation. For this reason, the timing for the valve body to be completely closed becomes T703, and an open/close valve response of the valve body behavior (701) has a characteristic delayed with respect to the ON-OFF operation of the pulse signal (601).

On the basis of the above configuration, in a case where the drive current (602) enters states (602*c* and 602*e*) deviated from the desired locus (602*b* and 602*d*), the valve body behavior (601) (the valve behavior of the injection of the stage) performs a desired operation (601*a*) without a problem. In a case where the drive current (602) does not reach the open valve current (602*a*) which is the control target, similarly to 601*b* and 601*c*, a moving amount (hereinafter, referred to as a lift amount) of the valve body is insufficient, and there is a concern that an open valve start timing (706) is deviated. In addition, there is a concern that the actual close valve timing (T704) is deviated from a desired close valve timing (T705).

In the invention, such a state is determined as normal or abnormal by the execution injection count determination unit (102*e*), and the multi-stage injection normality control determination unit (102*d*) detects, for example, a result that a normal fuel injection is detected only one time regardless of that the fuel injection command value is injected three stages.

In the description of FIG. 1, the multi-stage injection normality control determination unit (102*d*) is mounted as a control program which is executed in the microcontroller (102), but the invention is not limited to this mounting scheme. For example, the unit may be mounted as a hardware circuit in the drive IC (105).

Next, a case where abnormality different from that of FIG. 7 occurs will be described using FIG. 8.

Figure 8:
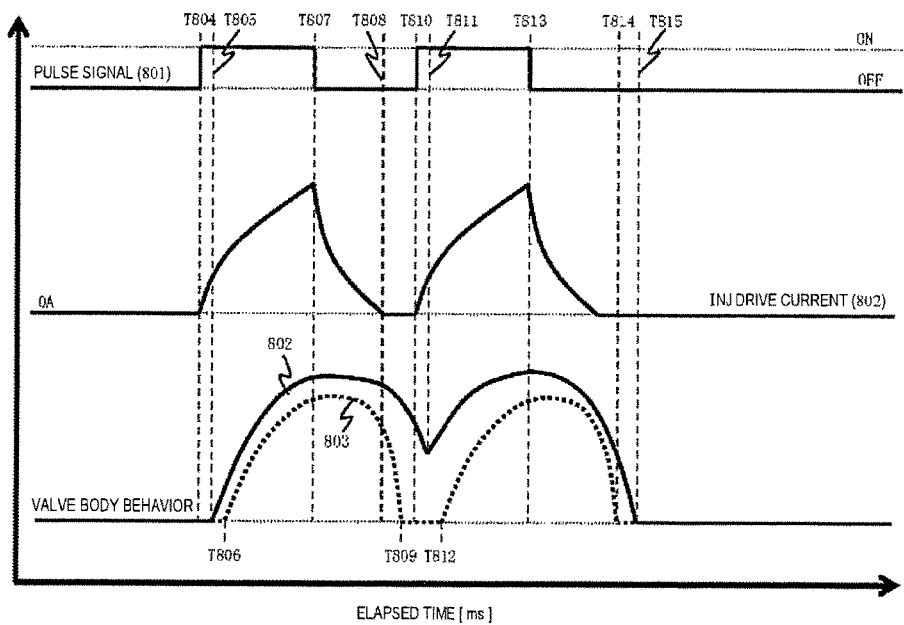
FIG. 8 is a diagram illustrating an example of a problem to be solved by the invention.

FIG. 8 illustrates a pulse signal (801), a drive current (802), and valve body behaviors (802 and 803) from the upper portion. First, the pulse signal transitions from OFF to ON (T804), and the drive current starts to be applied at this timing.

Thereafter, the application of the drive current (802) continues during a period when the pulse signal is turned on. Then, the application of the drive current (802) is stopped at a time point (T807) at which the pulse signal (802) is turned off. Finally, the residual current in the fuel injection valve (108) is leaked at T808 to be OA. Thereafter, the pulse signal (801) is turned on at T810 and applied again to the drive current (802) in order to command the injection of the second stage. Thereafter, the drive current (802) is applied to the fuel injection valve (108) until a time point (T813) at which the pulse signal is turned off, and the application of the drive current is stopped as described above.

Herein, making an explanation on the valve body behaviors (802 and 803) disposed in the lowest portion in the drawing, as described above, the open valve response is delayed with respect to the ON-OFF operation of the pulse signal (801), and the close valve response is delayed with respect to the OFF-ON operation. The response delay of the valve opening and the valve closing is generally different in each fuel injection valve (108) due to an individual deviation and a secular degradation. For example, making an explanation the valve body behavior of a fuel injection valve A depicted by a solid line 802, and the valve body behavior of a fuel injection valve B depicted by a broken line 803, the valve body response (802) of the fuel injection valve A is the first to start the valve opening operation (T805) with respect to the injection start timing T804 of the first stage, and then the valve body behavior (803) of the fuel injection valve B starts the valve opening operation at the timing of T806. In addition, since a deviation of the lift amount also occurs in the fuel injection valve (108), there is also caused a difference between 802 and 803.

Thereafter, the valve body behaviors (802 and 803) start the close valve operation from the time point (T807) at which the pulse signal (801) is turned off. While the valve body behavior (803) of the fuel injection valve B rapidly performs the close valve operation, the valve body behavior (802) of the fuel injection valve A smoothly performs the close valve operation.

Thereafter, the pulse signal (801) is turned on at T810 to perform the injection operation of the second stage. The valve body behavior (803) of the fuel injection valve B shows the same behavior as that of the first stage and performs the operation of the second stage according to a command value, but the valve body behavior (802) of the fuel injection valve A smoothly performs the close valve operation. Therefore, the valve opening operation of the second stage starts before the close valve operation is completed (T811). Thereafter, when the pulse signal (801) is turned off at T813, both of the valve body behaviors (802 and 803) show the close valve operation according to the respective response characteristics. A close valve complete timing of the fuel injection valve B becomes T814, and a close valve complete timing of the fuel injection valve A becomes T815.

In even this scene according to the invention, the state is determined as normal or abnormal by the execution injection count determination unit (102*e*), and the multi-stage injection normality control determination unit (102*d*) can detect a result that a normal fuel injection is detected with respect to the fuel injection valve A only one time regardless of that the fuel injection command value is injected in two stages.

In this way, in a case where the fuel is actually injected only by a less number of times in the multi-stage injection compared to the number of times of the fuel injection command value, a large deviation occurs in a total fuel injection amount in one combustion cycle. In addition, since the respective injection to be divided is linked to the spray, a spray travel range (penetration) in the cylinder is extended, the fuel is attached to the wall surface of a combustion chamber and a piston crown surface, and soot is increasingly discharged.

On the contrary to the example of the fuel injection valve A illustrated in FIG. 8, the characteristic is changed such that mechanical friction of a specific fuel injection valve is increased. Therefore, a necessary energy is not able to be obtained even when the same drive current as those of the other fuel injection valves is applied, and it can be considered of an error that the injection does not reach an actual injection in a case where the command is made in a short period of the pulse signal. Also in this case, the fuel injection valve changed in characteristic injects the fuel only by a less number of times compared to the fuel injection command value, the fuel injection amount is increasingly deviated, and thus an exhausting performance deteriorates.

In the invention, such abnormality is determined in consideration of the actual behavior of the fuel injection valve, so that the control can be appropriately performed to suppress deterioration in exhausting performance, or it can realize a process of notifying the abnormal state to an operator.

Figure 9:
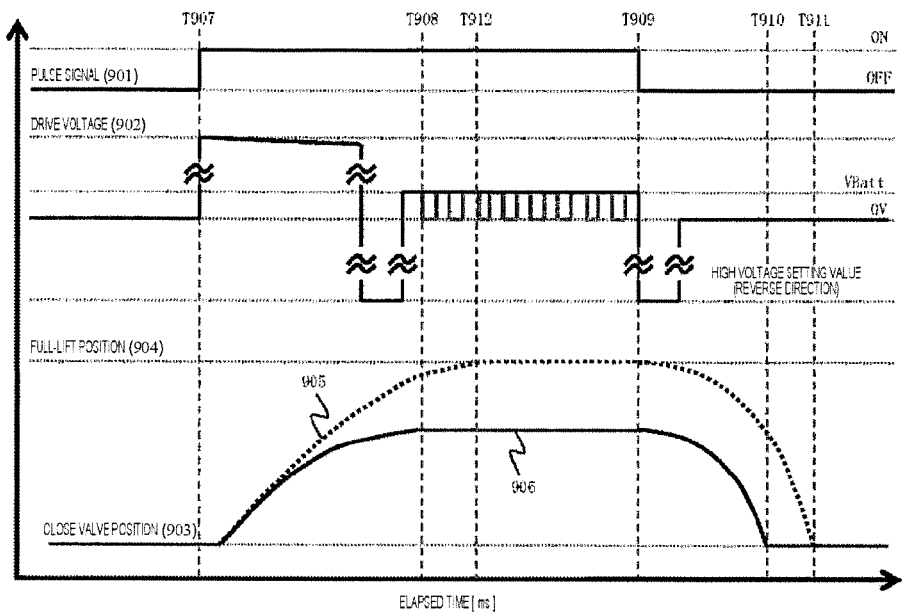
FIG. 9 is a diagram illustrating an embodiment of the invention.

Next, another abnormal state will be described using FIG. 9. In FIG. 9, a pulse signal (901) is turned on at T907, and the drive current (not illustrated) is applied to the fuel injection valve (108). Therefore, a drive voltage (902) shows the above behavior, and the valve body in the fuel injection valve (108) originally reaches a full-lift position (904) according to the length of an ON period of the pulse signal (201). For example, in a case where the fuel pressure on the upstream side of the fuel injection valve (108) is high with respect to the set drive current profile, and a case where the mechanical friction is increased in the fuel injection valve (108), the valve body does not reach the full-lift position (904), and there is a possibility to perform the close valve operation.

Specifically, 905 in the drawing illustrates the valve body behavior which becomes the normal operation. When the control target of the drive current (not illustrated) is shifted to the holding current (T908), the duty operation is performed in order to keep the holding current until a time point (T909) at which the pulse signal (901) is turned off.

However, in a case where the valve body of the fuel injection valve (108) finally falls into a state where the open valve force is insufficient due to the above problem, there is a concern that the valve body behavior becomes a behavior as denoted by 906. In this case, the drive current (not illustrated) is not possible to reach the holding current, and finally the duty operation does not occur by the circuit of TR_Hivb (204) between T908 and T909.

An internal resistance is increased by a coil used to apply a drive force to the valve body in the fuel injection valve (108), and current consumption is increased, and thus the current does not reach the target holding current value.

Therefore, in the invention, in a case where the pulse signal (901) is turned on exceeding the predetermined period, the normal or abnormal determination is performed on the basis of whether the duty operation of the drive voltage (902) is performed or not.

The information on whether the duty operation of the drive voltage (902) is performed is information which is overlapped in the output from the drive unit (106) of the fuel injection valve (Hi) to the fuel injection valve (108). According to the information, there is no additional sensor, and an error caused by disturbance is also small, and the operation state of the fuel injection valve (108) can be checked.

The predetermined period described herein can be appropriately set in a period (for example, T303 to T304) in which the drive current originally reaches the holding current.

Further, the above determination method is given as merely exemplary. There is also a determination method, for example, in which the determination is performed on the basis of learning in a case where the present operation is deviated by a predetermined amount or more compared to the past normal operation. Specifically, the close valve complete timing of 905 which is a normal valve body behavior becomes T911, and the close valve complete timing of 906 which is an abnormal valve body behavior becomes T910. Therefore, a predetermined criteria is set with respect to T911. In a case where a deviation equal to or more than the criteria occurs, the injection operation may be determined as abnormal.

Next, an exemplary control method of the invention will be described using FIG. 10.

First, in S1001, a conventional fuel injection control is performed, and information of the multi-stage injection controls is calculated in a case where it is determined that the multi-stage injection control can be performed or not.

Next, the procedure proceeds to S1002, and it is determined whether the multi-stage injection control is performed. In a case where the condition is not satisfied, no action is performed. In a case where the condition is satisfied, the procedure proceeds to S1003, and a process of inputting a parameter of the result of the fuel injection valve is performed. This process has been described using the fuel injection valve state input unit (102f) in FIG. 1, and another method will also be described below.

Thereafter, the procedure proceeds to S1004, and a multi-stage injection normality determination is performed. This determination method will also be described below. Thereafter, the procedure proceeds to S1005, and the multi-stage injection normality determination is performed. In a case where it is determined that the multi-stage injection is normal, the multi-stage injection continues. In a case where it is determined that the multi-stage injection is abnormal, the procedure proceeds to S1006, and a fail-safe process is performed as needed. As an example of the fail-safe process, the multi-stage injection is forbidden, the conventional one-time injection is performed, and a notification (MIL blinking) to the operator is performed as needed. In addition, the fail-safe process is also considered in which a total injection amount in one combustion cycle is adjusted to be a desired amount by correcting the injection amount of each divided injection as much as the count of the deviated injection while the multi-stage injection continues.

Next, S1003 in FIG. 10 will be described in detail. The configuration of FIG. 11 is basically not different from that of FIG. 1, and the detailed description of the overlapped configuration will be omitted. In S1003 in FIG. 10, a parameter according to a physical change is input on the basis of the operation state of the fuel injection valve (108), and a signal processing is performed as needed. With this regard, an exemplary drive voltage of the fuel injection valve (108) has been illustrated using FIG. 1, and other parameters can be included as illustrated in FIG. 11.

As an example, the fuel injection valve (108) is distorted with respect to a predetermined direction according to the operation of the fuel injection valve (108). In this case, a distortion sensor (1101) is attached to the fuel injection valve (108), and is input after being A/D converted. There is a need to perform setting a measurement period in accordance with timing at which a distortion occurs, noise remove, and frequency separation as needed. Similarly, a KNOCK sensor (1102) may be used. In this case, there is a need to remove seating noises of an intake valve and an exhaust valve which are provided in the KNOCK and the internal combustion engine. The processes of setting the measurement period and removing the seating noises become complicate when the multi-stage injection control is performed.

With these processes, finally, effective information is output to the execution injection count determination unit (102e) by detecting the open valve timing and the close valve timing which are described in FIG. 9.

As an example of another method, the fuel pressure is changed by driving the fuel injection valve (108), so that it is possible to use a fuel pressure sensor (1103) which measures a pressure of the fuel to be supplied to the fuel injection valve (108).

In addition, in recent years, there have been developed a plurality of detection methods in which a fine change in an energizing current value and an energizing voltage value of a solenoid used in the fuel injection valve (108) is detected out using a differentiator and a valve opening/closing operation of a valve body driven by the solenoid without using an external sensor such as the distortion sensor (1101) (for example, the description of disclosed in US 2011/0170224 A1). The information output from such an open/close valve detection function (1104) is information which is overlapped in the output from the drive unit (106) of the fuel injection valve (Hi) to the fuel injection valve (108), and is excellent in responsiveness compared to detecting the change in fuel pressure, and has a good accuracy. In particular, when the multi-stage injection control is performed, the fuel pressure is changed plural times in one combustion cycle with respect to each of a plurality of cylinders. However, it is difficult to detect the change of the fuel pressure caused by each injection. Therefore, it is more accurate to make a determination using the execution injection count determination unit (102e) on the basis of the information overlapping in the output to the fuel injection valve (108).

Therefore, the information output from the open/close valve detection function (1104) is also effective to the invention.

Next, a specific example of a process method of S1004 in FIG. 10 will be described.

Figure 12:
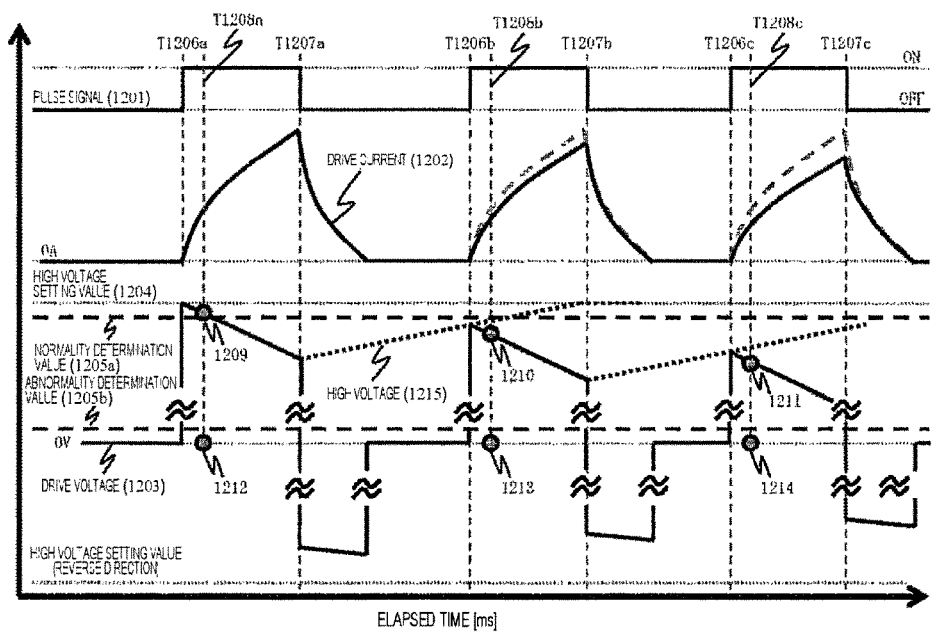
FIG. 12 is a diagram illustrating an embodiment of the invention.
Figure 13:
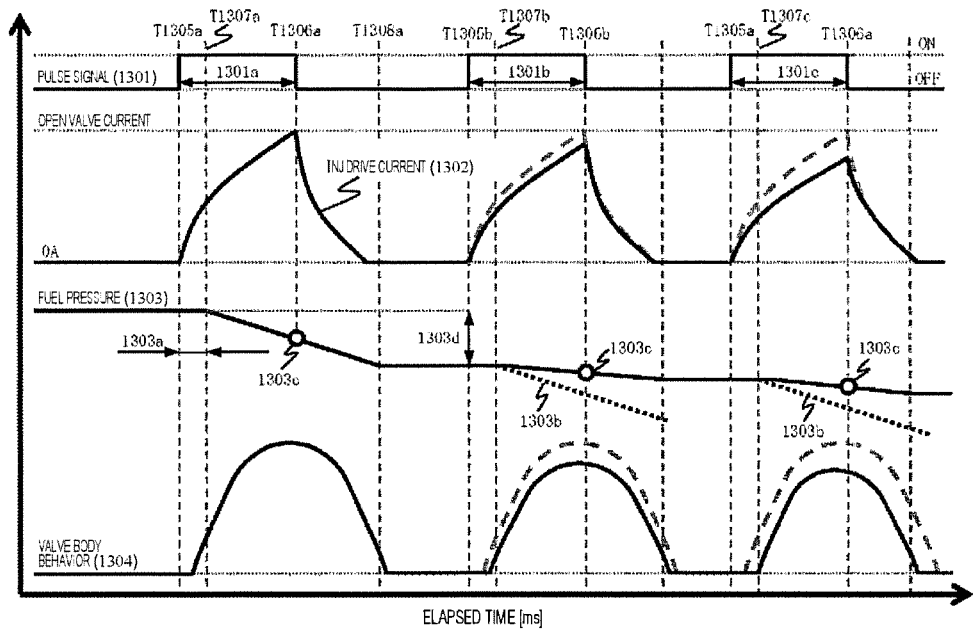
FIG. 13 is a diagram illustrating an embodiment of the invention.

FIG. 12 is based on the configuration of FIG. 1, and assumed that the information (116) output from the fuel injection valve state input unit (102f) is a drive voltage (1203) of the fuel injection valve (108).

Further, similarly to the scene described in FIGS. 6 and 7, this drawing schematically illustrates a scene in which the interval of the respective injection operations is short, and the next injection is performed before a high voltage (1215) reaches a high voltage setting value (1204).

A pulse signal (1201) in the drawing is a three-stage injection command, turned on at T1206a, T1206b, and T1206c, and turned off at T1207a, T1207b, and T1207c. The drive current (1202) is applied to the fuel injection valve (108) on the basis of a command of the pulse signal (1201), and the drive voltage (1203) shows the behavior as illustrated in the drawing.

As an example of the determination method using the execution injection count determination unit (102e) of the invention, the operation of the fuel injection valve (108) is monitored according to whether the drive voltage (1203) after the pulse signal (1201) is turned on and a predetermined time elapses (T1208a, T1208b, and T1208c) is equal to or more than a normality determination value (1205a).

In the drawing, the value of 1209 is illustrated at the time of determination at T1208a, and is equal to or more than the normality determination value (1205a), so that it is determined that the injection operation is normal. However, at the time of determination at T1208b and T1208c, the drive voltage (1203) becomes 1210 and 1211 at the respective time points, and not equal to or more than the normality determination value (1205a), so that it is determined that the injection operation is abnormal.

In addition, as another method, there is also a possibility that the fuel injection valve (108) does not operate with some cause even though a multi-stage injection command value calculated by the microcontroller (102) is set for the three-stage injection. Therefore, even in a case where the drive voltage (1203) is not changed near 0 V at T1208a after a predetermined time from the time point (T1206a) at which the pulse signal is turned on, it is considered that the injection operation is abnormal. This case is also effective to the invention.

Illustrating such a case in the drawing, it is determined that the injection operation is abnormal in a case where the drive voltage (1203) at the times (T1208a, T1208b, and T1208c) of determining abnormality becomes 1212, 1213, and 1214.

Further, the drive voltage (1203) in this drawing is denoted by the working pressure as described above, and an abnormality determination value (1205b) is also provided on a side in the reverse direction. It may be determined as abnormal in a case where the drive voltage (1203) at the time of determining abnormality is between the forward direction and the reverse direction. As a matter of course, since the drive unit of the fuel injection valve is provided on the upstream side (106) and the downstream side (107) with respect to the fuel injection valve (108) as illustrated in FIG. 1, the drive voltage (1203) can be input even when any one of the sides is set to a contact point or GND like the drive voltage (302) illustrated in FIG. 3. Therefore, the abnormality determination value or the normality determination value is not limited to the explanation.

Next, an example of the normality determination method or the abnormality determination method of the execution injection count determination unit (102e) will be described using the fuel pressure sensor (1103) described in FIG. 11.

A pulse signal (1301) is turned on at T1305a, T1305b, and T1305c, turned off at T1306a, T1306b, and T1306c, and the drive current (1302) is applied to the fuel injection valve (108) according to this command.

Herein, the execution injection count determination unit (102e) of the invention at least stores a fuel pressure (1303) before the first injection start timing (T1305a), and determines whether the operation of the fuel injection valve is normal or abnormal according to whether a difference (1303d) with respect to the fuel pressure (1303) at the next injection start timing (T1305b) is a predetermined difference.

The determination value may be set on the basis of the fuel pressure (1303) and the pulse signal (1301), a predetermined calculation is performed on the basis of the ON times (1301a, 1301b, and 1301c) of the pulse signal (1301), an estimated slope (1303b) is calculated, and it may be determined as normal when the calculation value falls within a predetermined range.

As another determination method, the fuel pressure (1303) has a characteristic of changing on the basis of a valve body behavior (1304). The characteristic is caused by the open/close valve response of the valve body described above, and the fuel is injected when the lift amount of the valve body is equal to or more than a predetermined amount, and thus the fuel pressure is delayed by a predetermined period from the ON timing (T1305a, T1305b, and T1305c) of the pulse signal (1301) and starts to be lowered (T1307a). In addition, a delay amount (1303a) in the characteristic is increased on the basis of the fuel pressure (1303). Therefore, the delay amount (1303a) and the slope (1303b) of the fuel pressure drop obtained in the above description are obtained on the basis of the fuel pressure. For example, it may be determined as abnormal in a case where the estimated fuel pressure and the actual fuel pressure (1303c) are deviated by a predetermined value or more at time points (T1306a, T1306b, and T1306c) at which the pulse signal (1301) is turned off.

In the drawing, the injection of the first stage is determined as normal even using any one of the determination methods described above, but the injection operations of the second and third stages are determined as abnormal.

Next, the abnormality determination method or the normality determination method using the open/close valve detection function described in FIG. 11 will be described using FIG. 14.

Figure 14:
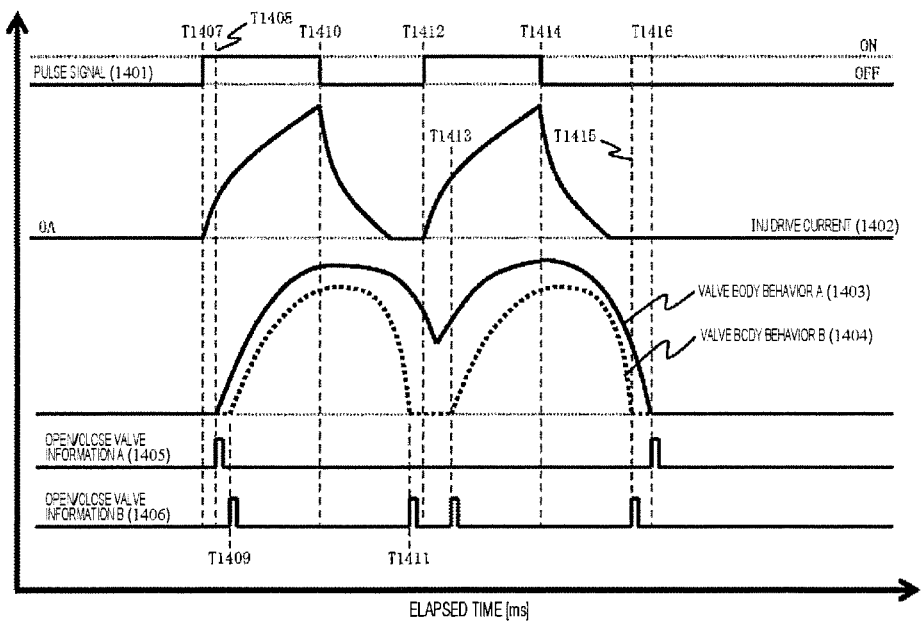
FIG. 14 is a diagram illustrating an embodiment of the invention.

The behaviors of a pulse signal (1401) and a drive current (1402) in FIG. 14 have been described above, and thus will be omitted. The valve body behavior is in a state as described in FIG. 8, the valve body behavior of the fuel injection valve A is depicted by 1404, and the valve body behavior of the fuel injection valve B is depicted by 1403.

The open/close valve detection function (1104) is (1) a method of detecting the open valve start timing (T1408 and T1409), (2) a method of detecting the open valve complete timing (T912 in FIG. 9), and (3) a method of detecting the close valve complete timing (T1415 and T1416) with respect to the valve body provided in the fuel injection valve (108). Even if any method can be used, the effect of the invention can be obtained. In this drawing, the case of (1) and (3) will be described as open/close valve information (the fuel injection valve A is 1405, and a fuel injection valve B1 is 406).

The valve body behavior (1403) of the fuel injection valve B operates normally with respect to a command of the pulse signal (1401) as described in FIG. 8. In a case where the open/close valve detection information is taken into consideration, the injection operation of the first stage can be detected at T1409 as the open valve start timing, and at T1411 as the close valve complete timing. Similarly, also the injection operation of the second stage can be detected at T1413 as the open valve start timing, and at T1415 as the close valve complete timing.

If the execution injection count determination unit (102e) of the invention can make detection in a predetermined range (for example, within a predetermined period after the pulse signal (1401) is turned on and off) of a pair of the open valve detection and the close valve detection, the operation of the fuel injection valve (108) is determined as normal.

With this regard, the valve body behavior (1403) of the fuel injection valve A is delayed in the close valve response, and thus shifted again to the valve opening operation without completing the close valve operation. Therefore, the open valve start timing of the first stage can be detected at T1408, and the close valve complete timing of the second stage can be detected at T1416. The original close valve complete timing of the first stage and the original open valve start timing of the second stage are not able to be detected. The execution injection count determination unit (102e) of the invention compares the ON timing (T1407 and T1412) and the OFF timing (T1410 and T1414) of the pulse signal (1401), and the open/close valve information (1405) to determine the injection abnormality including the abnormality of timing.

In addition, as another method, not only the above (3) but also the above determination method is possible. It is also possible to determine the abnormality in a case where the close valve is not able to be detected from the OFF timing (T1410 and T1416) of the pulse signal (1401) to the predetermined period.

Figure 15:
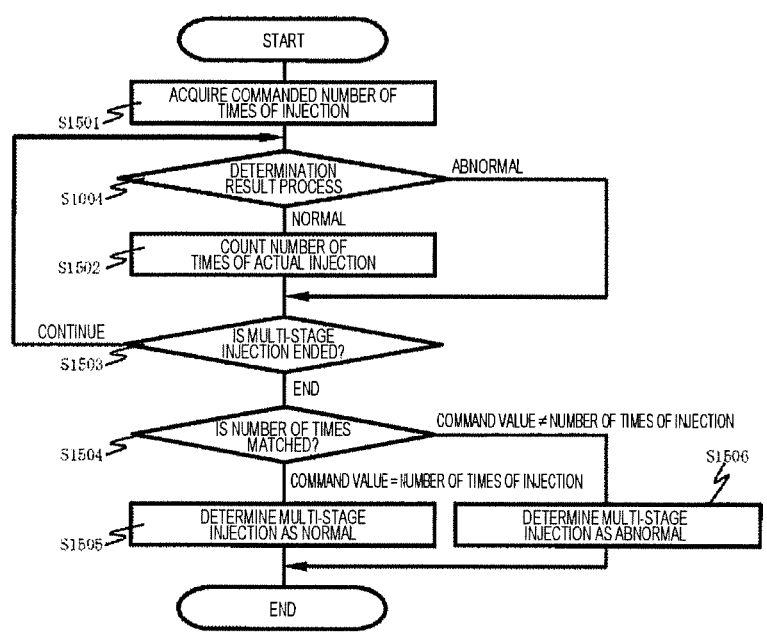
FIG. 15 is a diagram illustrating an example of a normality determination method of the invention.

Next, a determination result process (S1004) of FIG. 10 will be described using FIG. 15. Further, a control flowchart of FIG. 15 illustrates a process in one combustion cycle of one cylinder for convenience of explanation.

Figure 10:
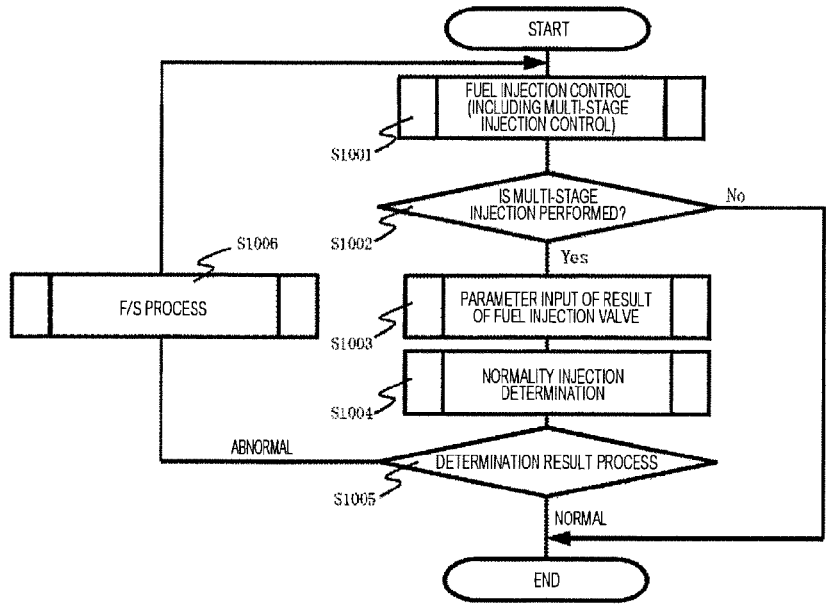
FIG. 10 is a diagram illustrating a control flowchart of the invention.
Figure 11:
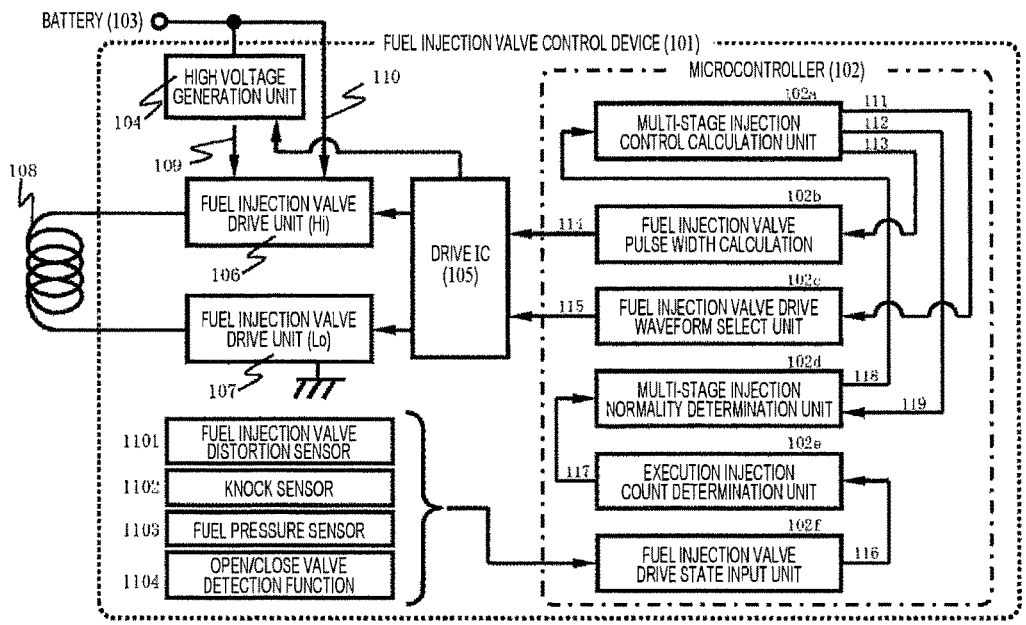
FIG. 11 is a diagram illustrating the entire configuration of the invention.

First, in S1501, the number of times of multi-stage injection of the cylinder is acquired, and is information (119) which is input by the multi-stage injection control calculation unit (S102a) including the process of S1001 of FIG. 10.

Next, it is determined whether the fuel injection valve (108) performs the normal operation or the abnormal operation at the time of multi-stage injection in the process of S1004 according to the above method.

In a case where the abnormal operation is determined in S1004, no action is performed. In a case where the normal operation is determined, the procedure proceeds to S1502, and the number of normal operations is counted. Thereafter, the procedure proceeds to S1503 to determine the current count of injection on the basis of the number of times of instructing multi-stage injection acquired in S1501. In a case where it is determined that the injection operation continues, the procedure returns to S1004 to monitor the operation of the fuel injection valve (108) of the next injection.

In a case where it is determined that the multi-stage injection of the cylinder is ended, the procedure proceeds to S1504. The command value acquired in S1501 and the value counted in S1502 are compared. In a case where the command value and the counted value are matched to each other, the procedure proceeds to S1505. It is determined that the multi-stage injection control is normally performed in this cylinder. In a case where the command value and the counted value are not matched to each other, the procedure proceeds to S1506. It is determined that the multi-stage injection control is abnormally performed in this cylinder is performed.

In addition, a required injection amount of the cylinder is set to the total injection amount in S1501. The fuel injection amount of one time at the time of the multi-stage injection control is calculated in S1004. The fuel injection amount is accumulated in S1502. Thereafter, in S1504, the total injection amount and the accumulated injection amount are compared. In a case where the accumulated fuel injection amount falls within a predetermined range, the procedure proceeds to S1505. In a case where the accumulated fuel injection amount exceeds the predetermined range, the procedure proceeds to S1506, a difference between the total injection amount and the accumulated injection amount is stored, and a process of increasing or decreasing the fuel injection amount as the fail-safe process.

With these methods, the control device of the invention can monitor the multi-stage injection control, guarantee the normal operation, and the operation can be immediately shifted to the fail-safe process in a case where abnormality occurs.

Further, the description has been given about the embodiment of the method of determining the number of times of multi-stage injection, but the injection start timing and the injection end timing of the conventional collective injection and each injection in the multi-stage injection and the normality of the injection amount may be determined in consideration of an actual behavior of the fuel injection valve. In addition, the multi-stage injection may determine whether an interval in the multi-stage injection is appropriately secured instead of determining whether the fuel injection is performed as many as the fuel injection command value. Therefore, it is possible to suppress that the exhaust deteriorates due to an extension of a spray travel range (penetration) which is unexpected in the appropriate correction process.

In addition, the control device of the invention can separately determine the abnormality of the drive circuit and the abnormality of the fuel injection valve, and also can switch the fail-safe process in accordance with the abnormality content obtained by the separate determination.

For example, in addition to the determination method described above, the abnormality of the well-known drive circuit may be detected by an OFF/ON fixation abnormality detection of a switching element embedded in the drive circuit, and the abnormality detection of the drive circuit disclosed in JP 2013-36344 A may be performed together, and thus any abnormality of the drive circuit and the fuel injection valve may be determined. In addition to the determination result, the fail-safe process, a process of correcting a control command from the microcontroller, a notification to an operator of a vehicle, or a process of storing logs in a memory of the control device may be performed in a switching manner.

Further, the determination method and the comparison method disclosed in this specification are given as merely exemplary, and the invention is not limited to such a manner of the description of the specification.

REFERENCE SIGNS LIST 101 fuel injection valve control device
102 microcontroller
105 drive IC
108 fuel injection valve

The invention claimed is:

1. A control device of a fuel injection valve that controls the fuel injection valve for injecting fuel to an internal combustion engine according to a control command, comprising;
   a calculation processing device configured to execute program related to control of the fuel injection valve, wherein;
   the control device is configured to determine whether an operation count of the fuel injection valve is at least equal to a number of times of injection indicated by the control command on the basis of a parameter that indicated an operation state of the fuel injection valve,
   the calculation processing device is configured to determine the operation count of the fuel injection valve for an operation corresponding to the control command on the basis of the parameter that indicates the operation state of the fuel injection valve,
   the control device of the fuel injection valve is configured to inject the fuel plural times in one combustion cycle of the internal combustion engine,
   the control device of the injection valve configured to determine whether the fuel injection valve performs a number of injections that is at least equal to the number of times of injection indicated by the control command on the of the parameter, and
   the control device of the fuel injection valve is configured such that, in a case where it is determined that the fuel injection valve does not perform an operation corresponding to the control command, the control device implements at least one of forbidding a divided multi-stage injection, notifying an operator of a vehicle, storing a log correcting the fuel injection amount in one combustion cycle, and correcting a fuel injection timing.

2. The control device of the fuel injection valve according to claim 1,
   wherein the control device of the fuel injection valve is configured to determine whether to implement an injection amount corresponding to the control command.

3. The control device of the fuel injection valve according to claim 1,
   wherein the parameter is at least one of an output value of a vibration sensor that detects vibrations of the fuel injection valve, an output value of a distortion sensor that detects a distortion of the fuel injection valve, an output value of a fuel pressure sensor that detects a pressure of the fuel to be supplied to the fuel injection valve, an open valve timing of the fuel injection valve, and a close valve timing of the fuel injection valve.

4. The control device of the fuel injection valve according to claim 1, further comprising:
   a drive circuit that includes a switching element configure to output a drive voltage to the fuel injection valve,
   wherein the parameter relates to same information as information that is output from the drive circuit to the fuel injection valve.

5. The control device of the fuel injection valve according to claim 4,
   Wherein the parameter is a drive current value of the fuel injection valve or a fine change of a drive voltage value.

6. The control device of the fuel injection valve according to claim 1,
   wherein the control device of the fuel injection valve is configured such that, when the control device performs an injection control plural times in one combustion cycle, at least one of the number of times of a normal operation or the number of times of an abnormal operation is calculated.

7. The control device of the fuel injection valve according to claim 6 the control device of the fuel injection valve is configured to:
   compare the number of times of injection indicated by the control command to at least one of an operation count for a normal operation or an operation count for an abnormal operation, and wherein the control device of the fuel injection valve is configured such that;
   in a case where the number of times of injection indicated by the control command is matches the operation count for the normal operation, or in a case where a value obtained by subtracting the operation count for the abnormal operation from a number of times of multistage injection indicated by the control command is equal to the number of times of injection indicated by the control command, the control device of the fuel injection valve determines that the injection control is normally performed, and
   in a case where the number of times of injection indicated by the control command does not match the operation count for the normal operation, or in a case where the value obtained by subtracting the operation count for the abnormal operation from the number of times of injection indicated by the control command does not equal the number of times of injection indicated by the control command, the control device of the fuel injection valve determines that the injection control is abnormally performed.

8. The control device of the fuel injection valve according to claim 4,
   wherein the control device is configured to control turning on and off the switching element to make a drive current become a predetermined current value on the basis of a measurement value of the drive current of the fuel injection valve, and
   wherein the parameter indicates at least one of an ON operation and an OFF operation of the switching element when a drive time of the fuel injection valve according to the control command is equal to or more than a predetermined time.

9. The control device of the fuel injection valve according to claim 1, further comprising:

a high voltage generating circuit configured to boost a battery voltage to generate a high voltage higher than the battery voltage, wherein the parameter is the high voltage, and wherein the control device of the fuel injection valve is configured to determine whether the fuel injection valve injects as many as the number of times indicated by the control command on the basis of whether a drive voltage of the fuel injection valve is equal to or more than a predetermined normality determination value of the high voltage when the high voltage is supplied immediately after driving according to the control command starts.

10. The control device of the fuel injection valve according to claim 1, wherein the parameter is a pressure of the fuel to be supplied to the fuel injection valve, and wherein the control device of the fuel injection valve is configured to determine whether the fuel injection valve injects as many as the number of times indicated by the control command on the basis of a fuel pressure before a first fuel injection starts in one combustion cycle, a drive period of the fuel injection valve according to the control command, and an estimated fuel pressure dropped from the fuel pressure.

11. The control device of the fuel injection valve according to claim 1, wherein the parameter is at least one of an open valve start timing, an open valve end timing, and a close valve end timing of the fuel injection valve.

12. The control device of the fuel injection valve according to claim 11, wherein the control device of the fuel injection valve is configured such that:

in a case where the open valve start timing or the open valve end timing and the close valve end timing fall within a predetermined period, the control device of the fuel injection valve determines that the fuel injection valve performs a normal operation, and in a case where the open valve start timing or the open valve end timing and the close valve end timing are detected beyond the predetermined period, the control device of the fuel injection valve determines that the fuel injection valve performs an operation corresponding to the control command.

13. The control device of the fuel injection valve according to claim 1, wherein the calculation processing device is configured to diagnose a drive circuit that includes a switching element for outputting a drive voltage to the fuel injection valve, to distinguish between an abnormal state of the drive circuit and an abnormal state in which the fuel injection valve does not perform an operation corresponding to the control command, and to select a process including at least one of a fail-safe process according to a determination result, a process of correcting the control command, a process of notifying an operator of a vehicle, and a process of storing a log.

14. A control device of a fuel injection valve that controls the fuel injection valve for injecting fuel to an internal combustion engine according to a control command, comprising:

a calculation processing device configured to execute a program related to the control of the fuel injection valve, wherein the control device is configured to determine whether an operation count of the fuel injection valve is at least equal to a number of times of injection indicated by the control command on the basis of a parameter that indicates an operation state of the fuel injection valve, the calculation processing device is configured to determine the operation count of the fuel injection valve for an operation corresponding to the control command on the basis of the parameter that indicates the operation state of the fuel injection valve, and the calculation processing device is configured to diagnose a drive circuit that includes a switching element for outputting a drive voltage to the fuel injection valve, to distinguish between an abnormal state of the drive circuit and an abnormal state in which the fuel injection valve does not perform an operation corresponding to the control command, and to select a process including at least one of a fail-safe process according to a determination result, a process of correcting the control command, a process of notifying an operator of a vehicle, and a process of storing a log.

15. A control device of a fuel injection valve that controls the fuel injection valve for injecting fuel to an internal combustion engine according to a control command, comprising:

a calculation processing device configured to execute a program related to the control of the fuel injection valve, wherein the control device is configured to determine whether an operation count of the fuel injection valve is at least equal to a number of times of injection indicated by the control command on the basis of a parameter that indicates an operation state of the fuel injection valve, the calculation processing device is configured to determine the operation count of the fuel injection valve for an operation corresponding to the control command on the basis of the parameter that indicates the operation state of the fuel injection valve, the control device of the fuel injection valve is configured to inject the fuel plural times in one combustion cycle of the internal combustion engine, the control device of the fuel injection valve is configured to determine whether the fuel injection valve performs a number of injections that is at least equal to the number of times of injection indicated by the control command on the basis of the parameter, the control device of the fuel injection valve is configured such that, when the control device performs an injection control plural times in one combustion cycle, at least one of the number of times of a normal operation or the number of times of an abnormal operation is calculated, the control device of the fuel injection valve is configured to compare the number of times of injection indicated by the control command to at least one of an operation count for a normal operation or an operation count for an abnormal operation, and the control device of the fuel injection valve is configured such that:

in a case where the number of times of injection indicated by the control command is matches the operation count for the normal operation, or in a case where a value obtained by subtracting the operation count for the abnormal operation from a number of times of multi-stage injection indicated by the control command is equal to the number of times of injection indicated by the control command, the control device of the fuel injection valve determines that the injection control is normally performed, and in a case where the number of times of injection indicated by the control command does not match the operation count for the normal operation, or in a case where the value obtained by subtracting the operation count for the abnormal operation from the number of times of injection indicated by the control command does not equal the number of times of injection indicated by the control command, the control device of the fuel injection valve determines that the injection control is abnormally performed.

* * * * *